United States Patent Office 3,442,913
Patented May 6, 1969

3,442,913
2-(TRIFLUOROMETHYL)-3-FUORIC ACID ESTERS AND OTHER 2 - FLUOROMETHYL FURAN DERIVATIVES
Kenneth K. Wyckoff, Ronald E. Bambury, and David M. Tennent, Ashland, Ohio, assignors to Richardson-Merrell Inc., New York, N.Y., a corporation of Delaware
No Drawing. Continuation-in-part of application Ser. No. 482,907, Aug. 26, 1965. This application Oct. 6, 1965, Ser. No. 493,534
Int. Cl. C07d 5/26, 5/16
U.S. Cl. 260—346.1     23 Claims This application is a continuation-in-part of our co-pending application Ser. No. 482,907, filed on Aug. 26, 1965 now U.S. Patent 3,405,163.

This invention relates to novel trifluoromethylfuran esters, certain derivatives of the esters, and their methods of preparation The novel trifluoromethylfuran esters (or simply esters) of this invention can be represented by the formula:

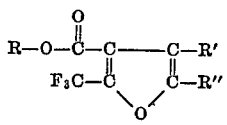

Formula I wherein R is alkyl, aryl, cycloalkyl or aralkyl and each of R' and R" is hydrogen, alkyl, aryl, cycloalkyl or aralkyl. These esters have utility as solvents and as chemical intermediates. As chemical intermediates they provide a route for the preparation of additional novel furan derivatives having a trifluoromethyl substituent on a carbon atom adjacent to the heterocyclic oxygen. Such derivatives are disclosed hereinafter and comprise furoic acids, halogenated and decarboxylated derivatives of the Formula I esters. They can be used as solvents for various aromatic compounds such as benzophenone, phenyl salicylate, and the like. Illustratively, at least one part, by weight, of benzophenone is soluble in about two parts of ethyl 5-methyl-2-trifluoromethylfuroate.

The trifluoromethyl group adds stability to the esters and the other heterocyclic compounds of this invention. Thus, the heterocyclic ring is not subject to general attack and degradation, as is generally found with the furan ring, e.g., under acid conditions.

The trifluoromethyl esters of Formula I are prepared by the cyclization of a trifluoromethyl dione of the formula:

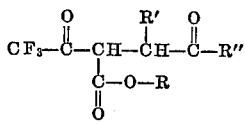

wherein each of R, R' and R" have the same meaning as the above Formula I. The cyclization can be effected by heating the dione in contact with a catalytically effective quantity of an acid. The reaction can be illustrated as follows:

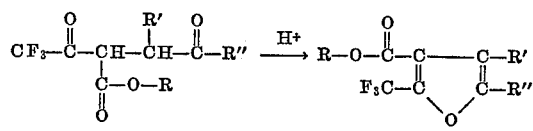

wherein each of R, R' and R" have the same meaning as in Formula I and H+ represents the acid catalyst. In the above formula for the novel heterocyclic esters, the compound is ethyl 5-methyl-2-trifluoromethyl-3-furoate when R is ethyl, R' is hydrogen and R" is methyl. The acid catalyst can be either a mineral acid or a strong organic acid. The quantity of acid catalyst employed is preferably an amount which is necessary to achieve initiation of the reaction. Generally, the quantity of the acid catalyst employed can vary over a wide range such as that of about 0.1 to about 10% by weight based on the dione reactant. Illustrative of suitable acids there can be mentioned sulfuric acid, hydrochloric acid, phosphoric acid, toluenesulfonic acid, trichloroacetic acid, ion-exchange resins containing free sulfonic acid groups, and the like.

The reaction for the preparation of the novel esters of Formula I can be conducted with or without an inert solvent. Illustrative of suitable solvents there can be mentioned various hydrocarbons, ketones, ethers, and the like, for example, benzene, toluene, glyme, diglyme, acetone and ether. The temperature at which the reaction is conducted can vary over a wide range such as that of about 30° C. to about 150° C. Preferably, if a solvent is employed, the reaction mixture is refluxed. The reaction time can vary over a wide range, e.g., from less than 0.5 hours to over 10 hours. The reaction can be followed by standard analytical techniques such as gas-liquid chromatography, ultraviolet, etc. After completion of the reaction, the product can be recovered and purified by conventional techniques. Thus, the solvent, if any, can be separated from the ester by fractional distillation, evaporation, or by selective extraction procedures. The crude ester can be purified by distillation, vapor phase chromatography, column chromatography, etc.

The trifluromethyl diones which are cyclized to prepare the esters of Formula I are described and claimed in our copending application Ser. No. 482,907, filed on Aug. 26, 1965. Briefly, in a preferred procedure, the diones are prepared as follows: To a solution of a trifluoroketone reactant (of the Formula $$CF_3-\overset{O}{\overset{\|}{C}}-CH_2-\overset{O}{\overset{\|}{C}}-O-R)$$

in about one to ten volumes of an inert solvent, e.g., benzene, is added an equal molar quantity of strong alkali metal base, e.g., sodium hydride. A catalyst of an alkali metal iodide, e.g., sodium iodide, is then added in an amount of about 0.01–0.2 moles, based on the trifluoroketone reactant. An α-haloketone, of the Formula $$R'-\overset{X}{\overset{|}{C}H}-\overset{O}{\overset{\|}{C}}-R''$$

is then added, in an amount which can vary from about 0.5 to about 2.0 moles per mole of the trifluoroketone reactant. The mixture is allowed to react at a temperature which may vary from about room temperature to the boiling point of the solvent used in the reaction until the concentration of the dione product has reached a maximum. The reaction can be followed by standard analytical techniques such as gas-liquid chromatography. The dione is then isolated by conventional techniques, e.g., fractional distillation of the reaction mixture. The letters R, R' and R" in the formulas for the trifluoroketo reactant and α-haloketone represent the same groups as that in Formula I, whereas X is a halogen such as bromine.

Illustrative of suitable groups as can be represented by R, R' and R" in the novel esters of Formula I, there can be mentioned: lower alkyls, i.e., alkyls having from 1 to 6 carbon atoms, and particularly alkyls of from 1 to 33 carbon atoms, e.g., methyl, ethyl, propyl, isopropyl, n-butyl, isobutyl, etc.; carbocyclic aryls having from 6 to 10 carbon atoms, i.e., phenyl or naphthyl; carbocyclic aralkyls of phenyl or naphthyl having from 7 to 14 carbon atoms in the alkyl group, e.g., benzyl, phenethyl, phenpropyl, α - naphthylmethyl, β - naphthylethyl, etc.; and cycloaliphatics having from 3 to 6 carbon atoms, such as cyclopropyl, cyclobutyl, cyclohexyl, etc. In the preferred trifluoromethylfuran esters of Formula I, R' is hydrogen whereas each of R and R" is lower alkyl. Advantageously, R″ is methyl since this permits conversion to aldehydes of further intermediate furan compounds after halogenation of the methyl group. Illustrative of the novel esters of Formula I, there can be mentioned: methyl 4-methyl-2-trifluoromethyl-3-furoate; ethyl 4-methyl-2-trifluoromethyl-3-furoate; tertiary butyl 4-methyl-2-trifluoromethyl-3-furoate; phenyl 4-methyl-2-trifluoromethyl-3-furoate; benzyl 4-methyl - 2 - trifluoromethyl-3-furoate; cyclohexyl 4-methyl-2-trifluoromethyl-3-furoate; ethyl 4-(n-propyl)-2-trifluoromethyl 3-furoate; ethyl 5-methyl-2-trifluoromethyl-3-furoate; ethyl 4,5-dimethyl-2-trifluoromethyl-3-furoate; ethyl 4,5-diphenyl-2-trifluoromethyl-3-furoate; ethyl 4-ethyl-2-trifluoromethyl-3-furoate; ethyl 5-ethyl-4-methyl - 2 - trifluoromethyl-3-furoate; phenyl 5-methyl - 2 - trifluoromethyl-3-furoate; ethyl 5 - methyl-4-phenyl-2-trifluoromethyl - 3 - furoate; benzyl 5-methyl-2-trifluoromethyl-3-furoate; and the like.

The trifluoromethyl furan esters of Formula I can be hydrolyzed to prepare the corresponding acids of Formula II which are described below, also referred to herein simply as the furoic acids. This reaction can be represented as follows:

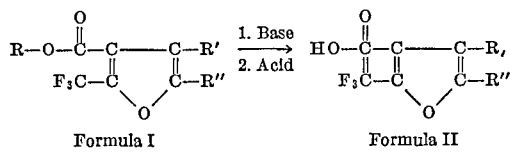

Formula I      Formula II wherein each of R′ and R″ represent the same broad and preferred groups recited for the Formula I esters. The hydrolysis can be accomplished by preparing an alkali metal salt of an ester of Formula I and then converting the salt to the free furoic acid by contact with a mineral acid. The alkali metal salt can be prepared by heating a Formula I compound, preferably in an inert solvent, e.g., a mixture of about 10 parts of ethanol and two parts of water at a temperature of about 55° C. to about 100° C. with an alkali metal hydroxide, e.g., that of sodium or potassium. The salt thus formed is then acidified, preferably with an inorganic acid such as hydrochloric or sulfuric, to a pH below about 4.0 to convert the salt to the furoic acid of Formula II. These acids are generally crystalline solids which can be recovered from the reaction mixture by conventional techniques, e.g., filtration.

Illustrative of furoic acids of the above Formula II there can be mentioned: 4-methyl-2-trifluoromethyl-3-furoic acid; 4-ethyl-2-trifluoromethyl-3-furoic acid; 4,5-dimethyl-2-trifluoromethyl - 3 - furoic acid; 4-methyl-5-phenyl-2-trifluoromethyl - 3 - furoic acid; 5-phenyl-2-trifluoromethyl-3-furoic acid; 5 - ethyl-2-trifluoromethyl-3-furoic acid; 5-methyl-2-trifluoromethyl-3-furoic acid; 5-cyclohexyl-2-trifluoromethyl-3-furoic acid; 4 - methyl-5-benzyl-2-trifluoromethyl-3-furoic acid; and the like.

The furoic acids can be decarboxylated to prepare trifluoromethylfurans as illustrated below in Formula III:

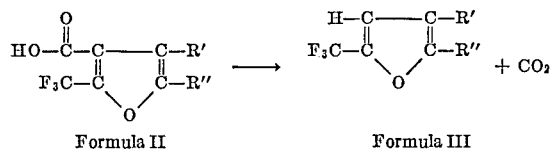

Formula II      Formula III wherein each of R′ and R″ represents the same broad and preferred groups as that in the Formula I esters. The furoic acid can be thermally decarboxylated to the trifluoromethylfurans of Formula III by heating at a temperature in the range of about 150° C. to 300° C. High boiling solvents such as quinoline, collidine, diglyme and quinaldine can be employed in the reaction; also decarboxylation catalysts such as copper oxide, copper sulfate, and copper-bronze can be employed. The product can be isolated and purified by conventional techniques as mentioned hereinbefore. Illustrative of trifluoromethyl furans of Formula III, there can be mentioned: 4-methyl-2-trifluoromethylfuran; 5 - phenyl-2-trifluoromethylfuran; 5-ethyl-2-trifluoromethylfuran; 4,5 - dimethyl-2-trifluoromethylfuran; 4-ethyl-2-trifluoromethylfuran; 4-methyl-5-phenyl-2-trifluoromethylfuran; 4-cyclohexyl - 2 - trifluoromethylfuran; 5-benzyl-2-trifluoromethylfuran; 5-methyl-2-trifluoromethylfuran; 5-ethyl-4-methyl-2-trifluoromethylfuran; 5-cyclohexyl-2-trifluoromethylfuran; and the like.

The trifluoromethylfurans of Formula III have utilities as solvents and as chemical intermediates. When used as solvents they can be utilized in much the same manner as furan.

Both the trifluoromethylfuran esters of Formula I and the trifluoromethylfurans of Formula III, when one of R′ or R″ is an alkyl and the other R′ or R″ is aryl or hydrogen, can be halogenated with halogenation agents which are allylic directing and the halogen has an atomic number above 9 to prepare compounds having one or two halogens on the alkyl carbon atom of the R′ or R″ group adjacent to the furan ring. These halogenated derivatives have utility as chemical intermediates, antibacterial agents and as feed additives to improve growth of animals, e.g., chickens.

Halogenated derivatives of this invention can be represented by the formulae:

(Formulr IV)

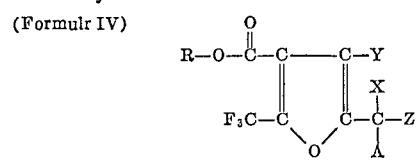

(Formula V)

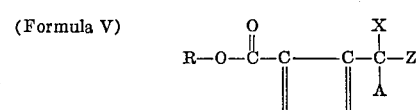

(Formula VI)

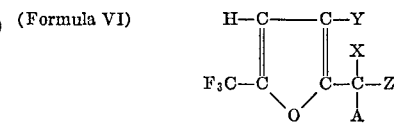

and (Formula VII)

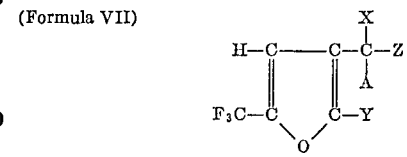

wherein Y is hydrogen or a carbocyclic aryl such as phenyl or naphthyl, X is a halogen having an atomic number greater than 9, i.e., chlorine, bromine or iodine, A is hydrogen or a halogen having an atomic number greater than 9 and Z is hydrogen or alkyl of 1 to about 5 carbon atoms. Preferably, each of Y and Z is hydrogen and the halogen of X or both X and A is bromine.

The halogenated derivatives of this invention can be prepared by heating an allylic directing halogenating agent with a Formula I ester or Formula III trifluoromethylfuran wherein one of R′ or R″ is lower alkyl and the other is hydrogen or carbocylic aryl having from 6 to 10 carbon atoms. Illustrative of allylic directing halogenating agents there can be mentioned: N-bromosuccinimide; N-chlorosuccinimide; N-iodosuccinimide; N-bromoacetamide; N-chloroacetamide, N-iodoacetamide; and the like. The reaction is preferably conducted in an inert solvent such as carbon tetrachloride. Equal molar quantities of the halogenating agent and the furan compound are preferably reacted to prepare monohalogenated derivatives whereas molar ratio of 2:1 of halogenating agent to furan compound is preferably employed in preparing the dihalogenated derivatives. A preferred process for preparing the halogenated derivatives is as follows: The furan reactant is dissolved in carbon tetrachloride and one mole of N-bromosuccinimide (or less preferably one mole of N-bromoacetamide) is added per mole of the furan reactant. Optionally, an activator such as dibenzoyl peroxide, azoisobutyronitrile, t-butyl hydroperoxide, copper laurate and the like can be added to improve the reaction. The mixture is then stirred and heated under reflux until all of the N-bromosuccinimide has been consumed (usually from about 0.5 to 5 hours). Optionally, the reaction mixture is illuminated with an ultraviolet source during the reflux period. The succinimide is removed by filtraton of the reaction mixture and the filtrate is evaporated in vacuo to remove the carbon tetrachloride. The brominated product is then purified by distillation, gas chromatography, column chromatography or crystallization. This procedure yields predominantly the monobrominated products. Two moles of the brominating agent per mole of furan reactant are employed when it is desired to obtain the dibrominated products.

Illustrative of the halogenated derivatives of this invention there can be mentioned:

ethyl 4-bromomethyl-2-trifluoromethyl-3-furoate;
phenyl 4-bromomethyl-2-trifluoromethyl-3-furoate;
cyclohexyl 4-bromomethyl-2-trifluoromethyl-3-furoate;
benzyl 4-bromomethyl-2-trifluoromethyl-3-furoate;
ethyl 5-(1,1-dibromomethyl)-2-trifluoromethyl-3-furoate;
ethyl 4-bromomethyl-5-phenyl-2-trifluoromethyl-3-furoate;
methyl 4-(1-bromoethyl)-2-trifluoromethyl-3-furoate;
ethyl 4-chloromethyl-2-trifluoromethyl-3-furoate;
n-propyl 4-iodomethyl-2-trifluoromethyl-3-furoate;
ethyl 5-dibromomethyl-2-trifluoromethyl-3-furoate;
phenyl 4-dibromomethyl-2-trifluoromethyl-3-furoate;
cyclohexyl 4-dibromomethyl-2-trifluoromethyl-3-furoate;
benzyl 4-dibromomethyl-2-trifluoromethyl-3-furoate;
ethyl 5-dibromomethyl-4-phenyl-2-trifluoromethyl-3-furoate;
methyl 5-chloromethyl-2-trifluoromethyl-3-furoate;
cyclohexyl 5-bromomethyl-2-trifluoromethyl-3-furoate;
ethyl 5-bromomethyl-4-phenyl-2-trifluoromethyl-3-furoate;
phenyl 5-bromomethyl-2-trifluoromethyl-3-furoate;
benzyl 5-bromomethyl-2-trifluoromethyl-3-furoate;
ethyl 5-(1,1-dibromoethyl)-2-trifluoromethyl-3-furoate;
ethyl 4-dichloromethyl-2-trifluoromethyl-3-furoate;
ethyl 5-bromomethyl-2-trifluoromethyl-3-furoate;
ethyl 4-diiodomethyl-2-trifluoromethyl-3-furoate;
4-bromomethyl-2-trifluoromethylfuran;
4-chloromethyl-2-trifluoromethylfuran;
4-iodomethyl-2-trifluoromethylfuran;
4-(1-bromoethyl)-2-trifluoromethylfuran;
5-bromomethyl-4-phenyl-2-trifluoromethylfuran;
4-dibromomethyl-2-trifluoromethylfuran;
4-dichloromethyl-2-trifluoromethylfuran;
5-(1,1-dibromoethyl)-2-trifluoromethylfuran;
4-(1,1-dibromomethyl)-2-trifluoromethylfuran;
2-dibromomethyl-3-phenyl-5-trifluoromethylfuran;
5-bromomethyl-2-trifluoromethylfuran;
5-dibromomethyl-2-trifluoromethylfuran; and the like.

The halogenated derivatives of Formulas IV to VII can be employed as the active antibacterial constituent of disinfectant compositions for the control of microorganisms such as: Bacillus subtilis; Pseudomonas aeruginosa; Salmonella typhimurium; Escherichia coli; Proteus mirabilis; Erysipelothrix insidiosa; Staphylococcus aureus; Steptococcus agalactiae; and the like. For such use, the halogenated derivatives can be dispersed in water or oil with or without a wetting, dispersing or emulsifying agent in concentrations which can vary over a wide range such as that of about 0.01% to 1% by weight of the water or oil and used as sprays to inhibit the growth of microorganisms. Also, they can be used in such concentrations as preservatives, e.g., in fuels and oils. For example, an aqueous solution of 2-dibromomethyl - 5 - trifluoromethylfuran inhibited the growth of the above named organisms when employed in a concentration of about 0.01% in water. The halogenated furans of this invention also stimulate the growth of animals, e.g., poultry, and provide a general improvement in health and appearance and enhanced feed efficiency through the administration of a supplemental animal feedstuff (or water) containing a small quantity of the halogenated derivatives. For such use the halogenated derivative can be employed over a wide range of concentrations such as that of about 10 to 200 grams thereof per ton of animal feed. Illustratively, 2-bromomethyl-5-trifluoromethylfuran was mixed in feed at a concentration of 20 grams per ton of feed and fed to seven day old broiler chickens for twenty-one days. The chicks showed a weight gain and improved feed conversion as compared to untreated controls.

The halogenated derivatives of Formulas IV to VII can be converted to the corresponding aldehydes or ketones by conventional techniques, e.g. (a) by the reaction of ethyl 5-(1-bromoethyl)-2-trifluoromethyl-3 - furoate with the sodium salt of 2-nitropropane to prepare ethyl 5-acetyl-2-trifluoromethyl-3-furoate; and (b) by the hydrolysis of ethyl 5-(1,1-dibromoethyl)-2-trifluoromethyl-3-furoate with an aqueous dispersion of calcium carbonate to prepare ethyl 5-acetyl-2-trifluoromethyl-3-furoate. Aldehyde derivatives also have antibacterial properties and can be used as antibacterial agents in a manner similar to the halogenated derivatives of Formulas IV to VII.

The aldehydes and ketone derivatives can be further reacted with various hydrazines and hydrazides to prepare the corresponding derivatives thereof in a manner similar to the reaction of 5-nitrofurfural with hydrazines and hydrazides.

The following examples are illustrative of the invention.

EXAMPLE 1

Preparation of 3-carbethoxy-1,1,1-trifluorohexane-2,5-dione reactant

To a stirred mixture of 8.6 g. (0.2 mole) of a 56% oil dispersion of sodium hydride and 100 ml. of anhydrous 1,2-dimethoxyethane was added, under anhydrous conditions, 36.8 g. (0.2 mole) of ethyl trifluoroacetoacetate over a 15 minute period. The mixture spontaneously heated up to the reflux temperature during the addition. The mixture was heated to maintain a gentle reflux until a clear solution was obtained and hydrogen evolution had ceased. Next 0.1 g. NaI was added and the solution was stirred an additional 5 minutes. Then 19.5 g. (0.21 mole) of chloroacetone was added over a 15 minute period. The mixture was refluxed and stirred for 5 hours after which it was filtered to remove the sodium chloride. The salt cake was washed with ether and the filtrate and washings were combined and evaporated. The residual oil was distilled using a 6 inch Vigreaux column at 0.9 mm. pressure. The material boiling between 70 and 73° C., $n_D^{25}$ 1.4010 was collected giving 17.1 g. (35% yield) of the desired product, 3-carbethoxy-1,1,1-trifluorohexane - 2,5-dione. This material gave a positive ferric chloride test and showed one major peak on V.P.C. analysis.

Analysis.—Calcd. for $C_9H_{11}F_3O_4$: C, 45.1; H, 4.62; F, 23.7. Found: C, 45.2; H, 4.74; F, 23.8.

EXAMPLE 2

Preparation of ethyl 5-methyl-2-trifluoromethyl-3-furoate

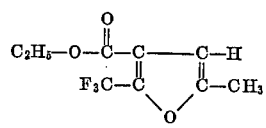

In a flask equipped with a Dean-Stark water separator was placed 75 ml. of toluene and 0.5 g. p-toluene-sulfonic acid monohydrate. The mixture was refluxed until the water had been removed from the acid. Then, 7.0 g. of 3-carbethoxy-1,1,1-trifluorohexane-2,5-dione was added and the mixture was refluxed for 17 hours. During this time 0.5 ml. of water was collected (theo. 0.5 ml.). The solution was then washed with water, dried over sodium sulfate and evaporated under reduced pressure. The residual oil was distilled at 0.05 mm. and the ethyl 5-methyl-2-trifluoromethyl-3-furoate, which boiled at 40°, was collected, $n_D^{25}$ 1.4184, wt. 3.1 g. (49% yield).

Analysis.—Calcd. for $C_9H_9O_3F_3$: C, 48.6; H, 4.08; F, 25.7. Found: C, 48.5; H, 4.14; F, 25.9.

EXAMPLE 3

Preparation of ethyl 5-bromomethyl-2-trifluoromethyl-3-furoate and ethyl 5-dibromomethyl-2-trifluoromethyl-3-furoate A mixture of 174.4 g. of N-bromosuccinimide, 200 g. ethyl 5-methyl-2-trifluoromethyl-3-furoate and 600 ml. of carbon tetrachloride was heated under reflux for 2 hours and 15 minutes. During this time a 275 watt sun lamp was shone on the mixture. The mixture was cooled and washed twice with 150 ml. portions of aqueous 5% sodium bicarbonate and then dried with magnesium sulfate. The carbon tetrachloride was removed by evaporation and the residual oil distilled at low pressure to give two main fractions. The first, B.P. 70–75° C. at .1 mm. was shown to be pure ethyl 5-bromomethyl-2-trifluoromethyl-3-furoate in Infrared and G.L.C. analysis.

Analysis.—Calcd. for $C_9H_8F_3BrO_3$: C, 35.9; H, 2.72; F, 18.9; Br, 26.5. Found: C, 36.0; H, 2.60; F, 18.8; Br, 26.4.

The higher boiling fraction, B.P. 82–84° C. at .03 mm. was found to be ethyl 5-(dibromomethyl)-2-trifluoromethyl-3-furoate.

Analysis.—Calcd. for $C_9H_7Br_2F_3O_3$: C, 28.45; H, 1.86; Br, 42.06; F, 15.00. Found: C, 28.55; H, 1.99; Br. 42.10; F, 15.10.

EXAMPLE 4

Preparation of 5-methyl-2-trifluoromethyl-3-furoic acid

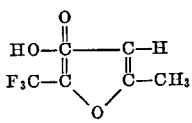

To 1.0 g. (0.0045 mole) of ethyl 5-methyl-2- trifluoromethyl-3-furoate was added 10 ml. ethanol, 2 ml. water and 0.2 g. sodium hydroxide and the solution was refluxed for 45 minutes. The mixture was poured into 100 ml. of water and acidified with hydrochloric acid to a pH of about 3. The solid acid, 5-methyl-2-trifluoromethyl-3-furoic acid, was collected by filtration, wt. 0.63 g. (58% yield), M.P. 122–125° C. The material was recrystallized from cyclohexane and dried under vacuum to give an analytical sample, M.P. 123–125° C.

Analysis.—Calcd. for $C_7H_5O_3F_3$: C, 43.4; H, 2.59; F, 29.4. Found: C, 43.6; H, 2.57; F, 29.4.

EXAMPLE 5

Preparation of 2-methyl-5-trifluoromethylfuran

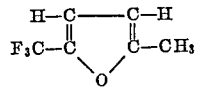

A distillation assembly using a 4 inch column packed with glass helices and an efficient condensing system was used in the decarboxylation of the acid. In the still pot of the distillation assembly was placed 20 ml. of quinoline and 2 g. of copper sulfate. To the mixture was added 10 g. of 5-methyl-2-trifluoromethyl-3-furoic acid. The mixture was heated rapidly to 210–220° C. while nitrogen was bubbled gently through the mixture to sweep out the decarboxylated material. When the evolution of decarboxylated material had ceased (about 10 minutes) the still pot was cooled and the process was repeated. When all the material had been decarboxylated the product in the receiver was taken up in ether and the mixture was dried over magnesium sulfate. The solution was then filtered and distilled. First a short Vigreaux column was employed to remove the ether and then a column packed with glass helices was used in distilling the product. From 120 g. of starting acid 65.9 g. (71.5% yield) of 2-methyl-5-trifluoromethylfuran, boiling at 81–82° C., $n_D^{25}$ 1.3685 was obtained. A gas-liquid chromatography analysis of the material indicated a high degree of purity.

Analysis.—Calcd. for $C_6H_5OF_3$: C, 48.0; H, 3.36; F, 38.0. Found: C, 48.2; H, 3.36; F, 37.9.

EXAMPLE 6

Preparation of 2-bromomethyl-5-trifluoromethylfuran and 2-dibromomethyl-5-trifluoromethylfuran To 64 g. (0.426 mole) of 2-methyl-5-trifluoromethylfuran dissolved in 500 ml. of carbon tetrachloride was added 83 g. (0.465 mole) of N-bromosuccinimide. The mixture was stirred and heated to the reflux temperature and 0.2 g. of benzoyl peroxide was added. After the mixture had been heated under reflux for 2 hours it was cooled and the succinimide was removed by filtration. The filtrate was distilled under reduced pressure using a 15 cm. Vigreaux column. After the bulk of the carbon tetrachloride had been removed the pressure was reduced to 14 mm. Two fractions were obtained. The first, B.P. 55–56° C., wt. 44.3 g. was shown by vapor phase chromatography on 5% SE 30 and elemental analysis to be 2-bromomethyl-5-trifluoromethylfuran.

Analysis.—Calcd. for $C_6H_4BrF_3O$: C, 31.5; H, 1.76; Br, 34.9; F, 24.9. Found: C, 31.2; H, 1.82; Br, 35.2; F, 24.8.

The second fraction, B.P. 56–75° C. at 14 mm., wt. 33.6 g. was shown by vapor phase chromatography to contain 2 major components. This material was refractionated at 9 mm. using a 10 cm. column packed with glass helices. Three fractions were obtained. The first, (B.P. 50–58° C., wt. 19.1 g.) proved to be pure monobromo compound. The second (B.P. 58–73° C., wt. 4.4 g.) was again a mixture of two components. The third fraction (B.P. 73–74° C., wt. 6.2 g.) was shown by vapor phase chromatography and elemental analysis to be 2-dibromomethyl-5-trifluoromethylfuran.

Analysis.—Calcd. for $C_6H_3Br_2F_3O$: C, 23.4; H, 0.98; Br, 52.0; F, 18.5. Found: C, 23.3; H, 1.12; Br, 52.0; F, 18.5.

EXAMPLE 7

Preparation of ethyl 4,5-dimethyl-2-trifluoromethyl-3-furoate

A solution of 75 ml. of toluene and 0.5 g. of p-toluenesulfonic acid monohydrate is heated at the reflux temperature in a system fitted with a Dean-Stark water separator until the water has been removed from the solution. After the addition of 20.5 g. (0.1 mole) of 3-carbethoxy-4-methyl-1,1,1-trifluorohexane-2,5-dione, the solution is heated at the reflux temperature for 18 hours. The solution is washed with water, dried over anhydrous magnesium sulfate and concentrated at reduced pressure. The residue containing ethyl 4,5-dimethyl-2-trifluoromethyl-3-furoate is purified by vapor phase chromatography.

EXAMPLE 8

Preparation of ethyl 4,5-diphenyl-2-trifluoromethyl-3-furoate

A solution of 75 ml. of toluene and 0.5 g. of p-toluenesulfonic acid monohydrate is heated at the reflux temperature in a system fitted with a Dean-Stark water separator until the water has been removed from the solution. After the addition of 37.8 g. (0.1 mole) of ethyl 3-benzoyl-3-phenyl-2-trifluoroacetylpropionate, the solution is heated at the reflux temperature for 18 hours. The solution is washed with water, dried over anhydrous magnesium sulfate and concentrated at reduced pressure. The residue containing ethyl 4,5-diphenyl-2-trifluoromethyl-3-furoate is purified by vapor phase chromatography.

EXAMPLE 9

Preparation of ethyl 2-trifluoromethyl-3-furoate

A solution of 75 ml. of toluene and 0.5 g. of p-toluenesulfonic acid monohydrate is heated at the reflux temperature in a system fitted with a Dean-Stark water separator until the water has been removed from the solution. After the addition of 22.6 g. (0.1 mole) of 3-carbethoxy-3-trifluoroacetylpropionaldehyde, the solution is heated at the reflux temperature for 18 hours. The solution is washed with water, dried over anhydrous magnesium sulfate and concentrated at reduced pressure. The residue containing ethyl 2-trifluoromethyl-3-furoate is purified by vapor phase chromatography.

EXAMPLE 10

Preparation of ethyl 4-ethyl-2-trifluoromethyl-3-furoate

A solution of 75 ml. of toluene and 0.5 g. of p-toluenesulfonic acid monohydrate is heated at the reflux temperature in a system fitted with a Dean-Stark water separator until the water has been removed from the solution. After the addition of 25.4 g. of 3-carbethoxy-2-ethyl-3-trifluoroacetylpropionaldehyde, the solution is heated at the reflux temperature for 18 hours. The solution is washed with water, dried over anhydrous magnesium sulfate and concentrated at reduced pressure. The residue containing ethyl 4-ethyl-2-trifluoromethyl-3-furoate is purified by vapor phase chromatography.

EXAMPLE 11

Preparation of ethyl 5-ethyl-4-methyl-2-trifluoromethyl-3-furoate

A solution of 75 ml. of toluene and 0.5 g. of p-toluenesulfonic acid monohydrate is heated at the reflux temperature in a system fitted with a Dean-Stark water separator until the water has been removed from the solution. After the addition of 26.5 g. (0.1 mole) of 3-carbethoxy-4-methyl-1,1,1-trifluoroheptane - 2,5 - dione, the solution is heated at the reflux temperature for 18 hours. The solution is washed with water, dried over anhydrous magnesium sulfate and concentrated at reduced pressure. The residue containing ethyl 5-ethyl-4-methyl - 2 - trifluoromethyl - 3 - furoate is purified by vapor phase chromatography.

EXAMPLE 12

Preparation of ethyl 4-methyl-5-phenyl-2-trifluoromethyl-3-furoate

A solution of 75 ml. of toluene and 0.5 g. of p-toluenesulfonic acid monohydrate is heated at reflux temperature in a system fitted with a Dean-Stark water separator until the water has been removed from the solution. After the addition of 31.6 g. (0.1 mole) of ethyl 3-benzoyl-2-trifluoroacetylbutyrate, the solution is heated at the reflux temperature for 18 hours. The solution is washed with water, dried over anhydrous magnesium sulfate and concentrated at reduced pressure. The residue containing ethyl 4-methyl-5-phenyl-2 - trifluoromethyl - 3 - furoate is purified by vapor phase chromatography.

EXAMPLE 13

Preparation of phenyl 5-methyl-2-trifluoromethyl-3-furoate

A solution of 75 ml. of toluene and 0.5 g. of p-toluenesulfonic acid monohydrate is heated at reflux temperature in a system fitted with a Dean-Stark water separator until the water has been removed from the solution. After the addition of 28.7 g. (0.1 mole) of phenyl 3-acetyl-2-trifluoroacetylpropionate, the solution is heated at the reflux temperature for 18 hours. The solution is washed with water, dried over anhydrous magnesium sulfate and concentrated at reduced pressure. The residue containing phenyl 5-methyl-2-trifluoromethyl-3-furoate is purified by vapor phase chromatography.

EXAMPLE 14

Preparation of ethyl-5-methyl-4-phenyl-2-trifluoromethyl-3-furoate

A solution of 75 ml. of toluene and 0.5 g. of p-toluenesulfonic acid monohydrate is heated at reflux temperature in a system fitted with a Dean-Stark water separator until the water has been removed from the solution. After the addition of 31.6 g. (0.1 mole) of 3-carbethoxy-4-phenyl-1,1,1-trifluorohexane - 2,5 - dione, the solution is heated at the reflux temperature for 18 hours. The solution is washed with water, dried over anhydrous magnesium sulfate and concentrated at reduced pressure. The residue containing ethyl 5-methyl-4 - phenyl - 2 - trifluoromethyl-3-furoate is purified by vapor phase chromatography.

EXAMPLE 15

Preparation of ethyl 4-dibromoethyl-2-trifluoromethyl-3-furoate

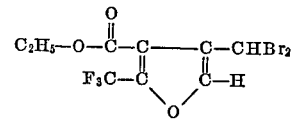

A mixture of 35.2 g. (0.2 mole) of N-bromosuccinimide, 19.5 g. (0.1 mole) of ethyl 4-methyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing ethyl 4-dibromomethyl-2-trifluoromethyl)-3-furoate is purified by gas chromatography (column).

EXAMPLE 16

Preparation of phenyl 4-dibromomethyl-2-trifluoromethyl-3-furoate

A mixture of 35.2 g. (0.2 mole) of N-bromosuccinimide, 27.0 g. (0.1 mole) of phenyl 4-methyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing phenyl 4-dibromomethyl-2-trifluoromethyl-3-furoate is purified by gas chromatography (column).

EXAMPLE 17

Preparation of ethyl 5-dibromoethyl-4-phenyl-2-trifluoromethyl-3-furoate

A mixture of 35.2 g. (0.2 mole) of N-bromosuccinimide, 29.8 g. (0.1 mole) of ethyl 5-methyl-4-phenyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing ethyl 5 - dibromoethyl - 4-phenyl-2-trifluoromethyl-3-furoate is purified by gas chromatography (column).

EXAMPLE 18

Preparation of ethyl 4-dibromoethyl-5-phenyl-2-trifluoromethyl-3-furoate

A mixture of 35.2 g. (0.2 mole) of N-bromosuccinimide, 29.8 g. (0.1 mole) of ethyl 4-methyl-5-phenyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing ethyl 4-dibromoethyl-5-phenyl-2-trifluoromethyl-3-furoate is purified by gas chromatography (column).

EXAMPLE 19

Preparation of ethyl 5-(1,1-dibromoethyl)-2-trifluoromethyl-3-furoate

A mixture of 35.2 g. (0.2 mole) of N-bromosuccinimide, 23.6 g. (0.1 mole) of ethyl 5-ethyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing ethyl 5-(1,1-dibromoethyl)-2-trifluoromethyl-3-furoate is purified by gas chromatography (column).

EXAMPLE 20

Preparation of 4-dibromomethyl-2-trifluoromethylfuran

A mixture of 35.2 g. (0.2 mole) of N-bromosuccinimide, 15.0 g. (0.1 mole) of 4-methyl-2-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing 4-dibromomethyl-2-trifluoromethylfuran is purified by gas chromatography (column).

EXAMPLE 21

Preparation of 5-(1,1-dibromoethyl)-2-trifluoromethylfuran

A mixture of 35.2 g. (0.2 mole) of N-bromosuccinimide, 16.4 g. (.01 mole) of 5-ethyl-2-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing 5-(1,1-dibromoethyl)-2-trifluoromethylfuran is purified by gas chromatography (column).

EXAMPLE 22

Preparation of 4-(1,1-dibromoethyl)-2-trifluoro methylfuran

A mixture of 35.2 g. (0.2 mole) of N-bromosuccinimide, 16.4 g. (0.1 mole) of 4-ethyl-2-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing 4-(1,1-dibromoethyl)-2-trifluoromethylfuran is purified by gas chromatography (column).

EXAMPLE 23

Preparation of 3-dibromomethyl-2-phenyl-4-trifluoromethylfuran

A mixture of 35.2 g. (0.2 mole) of N-bromosuccinimide, 22.6 g. (0.1 mole) of 3-methyl-2-phenyl-5-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing 3-dibromomethyl-2-phenyl-5-trifluoromethylfuran is purified by gas chromatography (column).

EXAMPLE 24

Preparation of 2-dibromomethyl-3-phenyl-5-trifluoromethylfuran

A mixture of 35.2 g. (0.2 mole) of N-bromosuccinimide, 22.6 g. (0.1 mole) of 2-methyl-3-phenyl-5-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil containing 2-dibromomethyl-3-phenyl-5-trifluoromethylfuran is purified by gas chromatography (column).

EXAMPLE 25

Preparation of ethyl 4-bromomethyl-2-trifluoromethyl-3-furoate

A mixture of 17.6 g. (0.1 mole) N-bromosuccinimide, 19.5 g. (0.1 mole) of ethyl 4-methyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the ethyl-4-bromomethyl-2-trifluoromethyl-3-furoate.

EXAMPLE 26

Preparation of phenyl 4-bromomethyl-2-trifluoromethyl-3-furoate

A mixture of 17.6 (0.1 mole) of N-bromosuccinimide, 27.0 g. (0.1 mole) of phenyl 4-methyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the phenyl 4-bromomethyl-2-trifluoromethyl-3-furoate.

EXAMPLE 27

Preparation of ethyl 5-bromomethyl-4-phenyl-2-trifluoromethyl-3-furoate

A mixture of 17.6 g. (0.1 mole) of N-bromosuccinimide, 29.8 g. (0.1 mole) of ethyl 5-methyl-4-phenyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the ethyl 5-bromomethyl-4-phenyl-2-trifluoromethyl-3-furoate.

EXAMPLE 28

Preparation of ethyl 4-bromomethyl-5-phenyl-2-trifluoromethyl-3-furoate

A mixture of 17.6 g. (0.1 mole) of N-bromosuccinimide, 29.8 g. (0.1 mole) of ethyl 4-methyl-5-phenyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the ethyl 4-bromomethyl-5-phenyl-2-trifluoromethyl-3-furoate.

EXAMPLE 29

Preparation of ethyl 5-(1-bromoethyl)-2-trifluoromethyl-3-furoate

A mixture of 17.6 g. (0.1 mole) of N-bromosuccinimide, 23.6 g. (0.1 mole) of ethyl 5-ethyl-2-trifluoromethyl-3-furoate and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the ethyl 5-(1-bromoethyl)-2-trifluoromethyl-3-furoate.

EXAMPLE 30

Preparation of 4-bromomethyl-2-trifluoromethylfuran

A mixture of 17.6 g. (0.1 mole) of N-bromosuccinimide, 15.0 g. (0.1 mole) of 4-methyl-2-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the 4-bromomethyl-2-trifluoromethylfuran.

EXAMPLE 31

Preparation of 5-(1-bromoethyl)-2-trifluoromethylfuran

A mixture of 17.6 g. (0.1 mole) of N-bromosuccinimide, 16.4 g. (0.1 mole) of 5-ethyl-2-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the 5-(1-bromoethyl)-2-trifluoromethylfuran.

EXAMPLE 32

Preparation of 4-(1-bromoethyl)-2-trifluoromethylfuran

A mixture of 17.6 g. (0.1 mole) of N-bromosuccinimide, 16.4 g. (0.1 mole) of 4-ethyl-2-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the 4-(1-bromoethyl)-2-trifluoromethylfuran.

EXAMPLE 33

Preparation of 5-bromoethyl-4-phenyl-2-trifluoromethylfuran

A mixture of 17.6 g. (0.1 mole) of N-bromosuccinimide, 22.6 g. (0.1 mole) of 2-methyl-3-phenyl-5-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the 5-bromomethyl-4-phenyl-2-trifluoromethylfuran.

EXAMPLE 34

Preparation of 4-bromomethyl-5-phenyl-2-trifluoromethylfuran

A mixture of 17.6 g. (0.1 mole) of N-bromosuccinimide, 22.6 g. (0.1 mole) of 4-methyl-5-phenyl-2-trifluoromethylfuran and 75 ml. of carbon tetrachloride is illuminated with a 275 watt sun lamp and heated at reflux temperature for 2.5 hours. The mixture is cooled and filtered and the filtrate is washed twice with 50-ml. portions of 5% sodium bicarbonate solution. After drying over anhydrous magnesium sulfate, the filtered solution is concentrated in vacuo. The residual oil is purified by gas chromatography (column) to obtain the 4-bromomethyl-5-phenyl-2-trifluoromethylfuran.

EXAMPLE 35

Preparation of 5-ethyl-2-trifluoromethyl-3-furoic acid

A solution of 23.6 g. (0.1 mole) of ethyl 5-ethyl-2-trifluoromethyl-3-furoate, 100 ml. of ethanol, 20 ml. of water and 10 g. of sodium hydroxide is heated at reflux temperature for 1 hour. The mixture is poured into 1 liter of water and acidified with HCl solution. The solid 5-ethyl-2-trifluoromethyl-3-furoic acid is removed by filtration, air dried and recrystallized from cyclohexane or benzene-petroleum ether.

EXAMPLE 36

Preparation of 5-phenyl-2-trifluoromethyl-3-furoic acid

A solution of 28.4 g. (0.1 mole) of ethyl 5-phenyl-2-trifluoromethyl-3-furoate, 100 ml. of ethanol, 20 ml. of water and 10 g. of sodium hydroxide is heated at reflux temperature for 1 hour. The mixture is poured into 1 liter of water and acidified with HCl solution. The solid 5-phenyl-2-trifluoromethyl-3-furoic acid is removed by filtration, air dried and recrystallized from cyclohexane or benzene-petroleum ether.

EXAMPLE 37

Preparation of 4-methyl-2-trifluoromethyl-3-furoic acid

A solution of 22.2 g. (0.1 mole) of ethyl 4-methyl-2-trifluoromethyl-3-furate, 100 ml. of ethanol, 20 ml. of water and 10 g. of sodium hydroxide is heated at reflux temperature for 1 hour. The mixture is poured into 1 liter of water and acidified with HCl solution. The solid 4-methyl-2-trifluoromethyl-3-furoic acid is removed by filtration, air dried and recrystallized from cyclohexane or benzene-petroleum ether.

EXAMPLE 38

Preparation of 4,5-dimethyl-2-trifluoromethyl-3-furoic acid

A solution of 23.6 g. (0.1 mole) of ethyl 4,5-dimethyl-2-trifluoromethyl-3-furate, 100 ml. of ethanol, 20 ml. of water and 10 g. of sodium hydroxide is heated at reflux temperature for 1 hour. The mixture is poured into 1 liter of water and acidified with HCl solution. The solid 4,5-dimethyl-2-trifluoromethyl-3-furoic acid is removed by

EXAMPLE 39

Preparation of 4-methyl-5-phenyl-2-trifluoromethyl-3-furoic acid

A solution of 29.8 g. (0.1 mole) of ethyl 4-methyl-5-phenyl-3-furoate, 100 ml. of ethanol, 20 ml. of water and 10 g. of sodium hydroxide is heated at reflux temperature for 1 hour. The mixture is poured into 1 liter of water and acidified with HCl solution. The solid 4-methyl-5-phenyl-2-trifluoromethyl-3-furoic acid is removed by filtration, air dried and recrystallized from cyclohexane or benzene-petroleum ether.

EXAMPLE 40

Preparation of 4-ethyl-2-trifluoromethyl-3-furoic acid

A solution of 23.6 g. (0.1 mole) of ethyl 4-ethyl-2-trifluoromethyl-3-furoate, 100 ml. of ethanol, 20 ml. of water and 10 g. of sodium hydroxide is heated at reflux temperature for 1 hour. The mixture is poured into 1 liter of water and acidified with HCl solution. The solid 4-ethyl-2-trifluoromethyl-3-furoic acid is removed by filtration, air dried and recrystallized from cyclohexane or benzene-petroleum ether.

EXAMPLE 41

Preparation of 4-methyl-2-trifluoromethylfuran

A distillation assembly using a 4 inch column packed with glass helices and an efficient cooling system is used for this decarboxylation procedure. A mixture of 8.1 g. (0.05 mole) of 4-methyl-2-trifluoromethyl-3-furoic acid, 40 ml. of quinoline and 4 g. of copper sulfate is heated rapidly to 210–20° C. while nitrogen is gently bubbled through the mixture to sweep out the decarboxylated material. When the distillation of decarboxylated product ceases (about 10 minutes), the still pot is cooled and the reaction repeated. The distillate is dissolved in ether and after drying over anhydrous magnesium sulfate, the filtered solution containing 4-methyl-2-trifluoromethylfuran is purified by vapor phase chromatography (column).

EXAMPLE 42

Preparation of 5-phenyl-2-trifluoromethylfuran

A distillation assembly using a 4 inch column packed with glass helices and an efficient cooling system is used for this decarboxylation procedure. A mixture of 12.8 g. (0.05 mole) of 5-phenyl-2-trifluoromethyl-3-furoic acid, 40 ml. of quinoline and 4 g. of copper sulfate is heated rapidly to 210–20° C. while nitrogen is gently bubbled through the mixture to sweep out the decarboxylated material. When the distillation of decarboxylated product ceases (about 10 minutes), the still pot is cooled and the reaction repeated. The distillate is dissolved in ether and after drying over anhydrous magnesium sulfate, the filtered solution containing 5-phenyl-2-trifluoromethylfuran is purified by vapor phase chromatography (column).

EXAMPLE 43

Preparation of 5-ethyl-2-trifluoromethylfuran

A distillation assembly using a 4 inch column packed with glass helices and an efficient cooling system is used for this decarboxylation procedure. A mixture of 10.4 g. (0.05 mole) of 5-ethyl-2-trifluoromethyl-3-furoic acid, 40 ml. of quinoline and 4 g. of copper sulfate is heated rapidly to 210–20° C. while nitrogen is gently bubbled through the mixture to sweep out the decarboxylated material. When the distillation of decarboxylated product ceases (about 10 minutes), the still pot is cooled and the reaction repeated. The distillate is dissolved in ether and after drying over anhydrous magnesium sulfate, the filtered solution containing 5-ethyl-2-trifluoromethylfuran is purified by vapor phase chromatography (column).

EXAMPLE 44

Preparation of 4,5-dimethyl-2-trifluoromethylfuran

A distillation assembly using a 4 inch column packed with glass helices and an efficient cooling system is used for this decarboxylation procedure. A mixture of 8.8 g. (0.05 mole) of 4,5-dimethyl-2-trifluoromethyl-3-furoic acid, 40 ml. of quinoline and 4 g. of copper sulfate is heated rapidly to 210–20° C. while nitrogen is gently bubbled through the mixture to sweep out the decarboxylated material. When the distillation of decarboxylated product ceases (about 10 minutes), the still pot is cooled and the reaction repeated. The distillate is dissolved in ether and after drying over anhydrous magnesium sulfate, the filtered solution containing 4,5-dimethyl-2-trifluoromethylfuran is purified by vapor phase chromatography (column).

EXAMPLE 45

Preparation of 4-ethyl-2-trifluoromethylfuran

A distillation assembly using a 4 inch column packed with glass helices and an efficient cooling system is used for this decarboxylation procedure. A mixture of 8.8 g. (0.05 mole) of 4-ethyl-2-trifluoromethyl-3-furoic acid, 40 ml. of quinoline and 4 g. of copper sulfate is heated rapidly to 210–20° C. while nitrogen is gently bubbled through the mixture to sweep out the decarboxylated material. When the distillation of decarboxylated product ceases (about 10 minutes), the still pot is cooled and the reaction repeated. The distillate is dissolved in ether and after drying over anhydrous magnesium sulfate, the filtered solution containing 4-ethyl-2-trifluoromethylfuran is purified by vapor phase chromatography (column).

EXAMPLE 46

Preparation of ethyl 5-methyl-2-trifluoromethyl-3-furoate

A mixture of 12.0 grams (g.) of 3-carbethoxy-1,1,1-trifluorohexane-2,5-dione and 60 milliliters (ml.) of 40% aqueous sulfuric acid was heated under reflux for 2 hours. After cooling, the mixture was extracted with ether. The ether phases were combined and the ether evaporated under reduced pressure. The residual oil (6.8 g., 61% yield) was shown by gas-liquid chromatography analysis to be ethyl 5-methyl-2-trifluoromethyl-3-furoate.

The vapor phase chromatography columns employed in the examples are 5% SE-30 (a resin sold by the General Electric Company) on Gas-Chrom Z (a firebrick support sold by Applied Science Laboratories, Inc.) and 5% of diethylene glycol succinate on Gas-Chrom Z.

What is claimed is:

1. A compound of the formula $$R-O-\overset{O}{\underset{\|}{C}}-\underset{F_3C-C}{\overset{C}{\|}}\underset{\diagdown O \diagup}{\overset{C-R''}{\|}}C-R'$$

wherein R is a member selected from the group consisting of lower alkyl, cycloalkyl having from 3 to 6 carbon atoms, phenyl, naphthyl, phenylalkyl having 7 to 14 carbon atoms and naphthylalkyl having from 11 to 14 carbon atoms and each of R' and R'' is a member selected from the group consisting of hydrogen, lower alkyl, cycloalkyl having from 3 to 6 carbon atoms, phenyl, naphthyl, phenylalkyl having 7 to 14 carbon atoms and naphthylalkyl having from 11 to 14 carbon atoms.

2. A compound of claim 1 wherein each of R and R'' is lower alkyl having from 1 to 3 carbon atoms and R' is hydrogen.

3. Phenyl 5-methyl-2-trifluoromethyl-3-furoate.

4. A compound of the formula

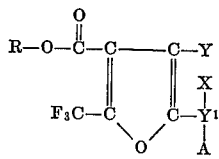

wherein R is a member selected from the group consisting of lower alkyl, cycloalkyl having from 3 to 6 carbon atoms, phenyl, naphthyl, phenylalkyl having 7 to 14 carbon atoms and naphthylalkyl having 11 to 14 carbon atoms; one of Y and $Y^1$ is a member selected from the group consisting of hydrogen, phenyl and naphthyl and the remaining Y or $Y^1$ is the group

wherein, X is a halogen having an atomic number greater than 9, A is a member selected from the group consisting of a halogen having an atomic number greater than 9 and hydrogen, and Z is a member selected from the group consisting of hydrogen and alkyl having from 1 to 5 carbon atoms.

5. A compound of claim 4 wherein R is lower alkyl, and each of Y, A and Z is hydrogen.

6. A compound of claim 5 wherein X is bromine.

7. A compound of claim 4 wherein R is lower alkyl, A is halogen, and each of Y and Z is hydrogen.

8. A compound of claim 7 wherein X and A are bromine.

9. Ethyl 5-bromomethyl-2-trifluoromethyl-3-furoate.

10. Ethyl 5-(1,1-dibromoethyl) - 2 - trifluoromethyl-3-furoate.

11. Phenyl 5 - dibromomethyl - 2 - trifluoromethyl-3-furoate.

12. A compound of the formula

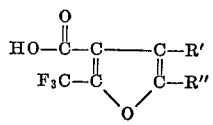

wherein each of R' and R" is a member selected from the group consisting of hydrogen, lower alkyl, cycloalkyl having from 3 to 6 carbon atoms, phenyl, naphthyl, phenylalkyl having 7 to 14 carbon atoms and naphthylalkyl having 11 to 14 carbon atoms.

13. A compound of claim 12 wherein R' is hydrogen and R" is lower alkyl having from 1 to 3 carbon atoms.

14. 5-methyl-2-trifluoromethyl-3-furoic acid.

15. A compound of the formula

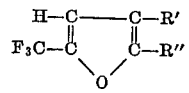

wherein each of R' and R" is a member selected from the group consisting of hydrogen, lower alkyl, cycloalkyl having from 3 to 6 carbon atoms, phenyl, naphthyl, phenylalkyl having 7 to 14 carbon atoms and naphthylalkyl having from 11 to 14 carbon atoms.

16. A compound of claim 15 wherein R' is hydrogen and R" is lower alkyl having from 1 to 3 carbon atoms.

17. A compound of the formula

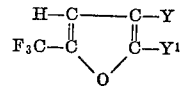

wherein one of Y and $Y^1$ is a member selected from the group consisting of hydrogen, phenyl and naphthyl and the remaining Y or $Y^1$ is the group

wherein X is a halogen having an atomic number greater than 9; A is a member selected from the group consisting of hydrogen and a halogen having an atomic number greater than 9; and Z is a member selected from the group consisting of hydrogen and alkyl having from 1 to 5 carbon atoms.

18. A compound of claim 17 wherein each of A, Y and Z is hydrogen.

19. A compound of claim 18 wherein X is bromine.

20. A compound of claim 17 wherein A is halogen and each of Y and Z is hydrogen.

21. A compound of claim 20 wherein each of A and X is bromine.

22. 5-dibromomethyl-2-trifluoromethylfuran.

23. 5-(1-bromoethyl)-2-trifluoromethylfuran.

References Cited

UNITED STATES PATENTS 2,744,917  5/1956  Jones et al.

OTHER REFERENCES

Wertheim, Textbook of Organic Chemistry, pages 763 to 764 (1945) Second Edition.

Yale, Jour. Med. Pharm. Chem., vol. 1, No. 2, pp. 121–131 (1959).

ALEX MAYEL, *Primary Examiner.*

B. I. DENTE, *Assistant Examiner.*

U.S. Cl. X.R.

99—4; 106—311; 260—347.5; 424—285